(12) United States Patent
Compton

(10) Patent No.: US 6,986,239 B1
(45) Date of Patent: Jan. 17, 2006

(54) LAWN MOWER CUTTING IMPLEMENT

(76) Inventor: Andrew Compton, 10001 N. Cemetery Rd., Yukon, OK (US) 73099

(*) Notice: Subject to any disclaimer, the term of this patent is extended or adjusted under 35 U.S.C. 154(b) by 0 days.

(21) Appl. No.: 10/875,393

(22) Filed: Jun. 25, 2004

(51) Int. Cl.
 *A01D 19/00* (2006.01)
(52) U.S. Cl. ...................................................... 56/17.5
(58) Field of Classification Search ................ 56/17.5, 56/255, 295, DIG. 19, DIG. 20
 See application file for complete search history.

(56) References Cited

U.S. PATENT DOCUMENTS

| | | | |
|---|---|---|---|
| 2,547,540 A * | 4/1951 | Roberts | 56/255 |
| 3,183,655 A * | 5/1965 | Kern et al. | 56/295 |
| 3,473,306 A * | 10/1969 | Ewasko | 56/17.5 |
| 3,589,112 A * | 6/1971 | Frohmader | 56/17.5 |
| 4,126,990 A | 11/1978 | Fisher et al. | |
| 4,235,068 A | 11/1980 | Comer | |
| 4,301,642 A | 11/1981 | Thurber | |
| 4,351,144 A | 9/1982 | Benenati | |
| 4,513,563 A | 4/1985 | Roser et al. | |
| 4,905,465 A * | 3/1990 | Jones et al. | 56/295 |
| 4,924,665 A | 5/1990 | Crosley | |
| 4,936,884 A * | 6/1990 | Campbell | 56/12.7 |
| 5,025,615 A * | 6/1991 | Hawkenson | 56/12.7 |
| 5,479,763 A * | 1/1996 | Coble | 56/12.7 |
| 5,491,962 A * | 2/1996 | Sutliff et al. | 56/12.7 |
| 5,701,728 A * | 12/1997 | Koka et al. | 56/12.7 |
| 5,711,141 A * | 1/1998 | Pitman et al. | 56/255 |
| 5,768,867 A | 6/1998 | Carlsen | |

* cited by examiner

*Primary Examiner*—Thomas B. Will
*Assistant Examiner*—Alicia Torres
(74) *Attorney, Agent, or Firm*—Richard C. Litman

(57) ABSTRACT

The lawn mower cutting implement has an elongated mounting plate adapted for attachment to a lawn mower in lieu of a conventional blade with an end piece attached to opposite ends of the mounting plate. The plate is bent or twisted to generate airflow when the plate is rotated by the lawn mower drive shaft. Each end piece supports at least two cutting elements at different elevations with respect to each other so that there is at least a lower cutting element for cutting grass to a desired height and an upper cutting element for mulching suspended clippings.

9 Claims, 5 Drawing Sheets

US 6,986,239 B1

LAWN MOWER CUTTING IMPLEMENT

BACKGROUND OF THE INVENTION

1. Field of the Invention

The present invention relates to a lawn mower cutting implement. Specifically, the invention relates to a lawn mower cutting implement that has a cutting element, such as flexible nylon cord, spring steel, or metal wire, extending from opposite ends of a shortened mounting plate that replaces a conventional lawn mower blade.

2. Description of the Related Art

Conventional lawn mower blades are made of flat plates of steel having an edge ground thereon and a hole for securing same to the lower end of a vertical output shaft of an engine. Typically, the plate has a bend or twist on either side for generating airflow for circulating and expelling grass clippings. String trimmers are also known, which have replaceable or extensible nylon line for cutting grass, weeds, and other undesired vegetation. While there have been attempts at combining these two technologies, there has not yet been a commercially viable system that both utilizes replaceable media for cutting grass and provides necessary airflow for lifting and expelling clippings.

U.S. Pat. No. 4,126,990, issued to Fisher et al. on Nov. 28, 1978, shows a conventional push mower with a circular disc in place of a mower blade, the disc supporting a plurality of nylon pins extending radially. Adjacent each pin, upwardly swept vanes are formed into the disc for creating an upward flow of air and agitating the grass. U.S. Pat. No. 4,235,068, issued Nov. 25, 1980 to Corner, discloses a mower attachment comprising a device for feeding nylon cord that cuts grass. This device is positioned below a fan blade that generates airflow, improves the evenness of the cut, suspends grass particles above the cutting mechanism, and exhausts the particles to a catch bag.

U.S. Pat. No. 4,301,642, issued to Thurber on Nov. 24, 1981, describes a lawn mower having a circular disc supporting a plurality of nylon chords extending radially therefrom, the disc having, on its upper surface, a plurality of vertical, radially-oriented flexible fins for discharging cut grass. For the purpose of providing improved mulching action, U.S. Pat. No. 4,351,144, issued Sep. 28, 1982 to Benenati, shows a polymer mower blade having 12 evenly spaced cutting edges disposed at 3 different heights.

U.S. Pat. No. 4,513,563, issued Apr. 30, 1985 to Roser et al., discloses a lawn mower having a star-shaped hub supporting and capturing enlarged ends of nylon filaments so that the free ends extend radially. U.S. Pat. No. 4,924,665, issued May 15, 1990, to Crosley, teaches a circular disc having a plurality of wire cutters extending therefrom, and radial fins each extending along the disc radius, extending at an angle up from the plane of the disc to generate airflow.

U.S. Pat. No. 5,768,867, issued Jun. 23, 1998 to Carlsen, discloses a similar device having a plurality of radially disposed nylon filaments extending from a hub.

None of the above inventions and patents, taken either singly or in combination, is seen to describe the instant invention as claimed. Thus a lawn mower cutting implement solving the aforementioned problems is desired.

SUMMARY OF THE INVENTION

The lawn mower cutting implement has an elongated mounting plate adapted for attachment to a lawn mower in lieu of a conventional blade with an end piece attached to opposite ends of the mounting plate. The plate is bent or twisted to generate airflow when the plate is rotated by the lawn mower drive shaft. Each end piece supports at least two cutting elements at different elevations with respect to each other so that there is at least a lower cutting element for cutting grass to a desired height and an upper cutting element for mulching suspended clippings.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
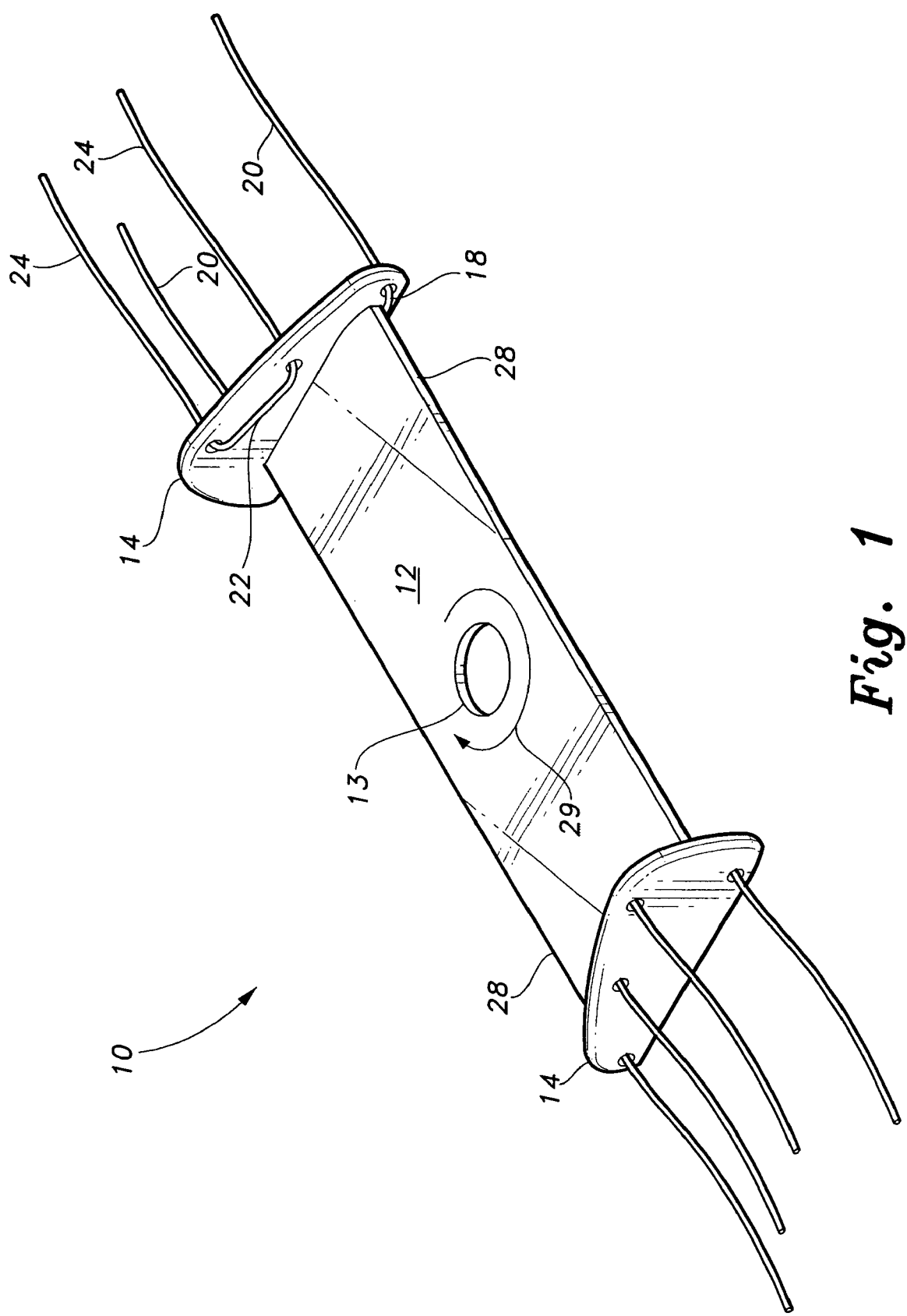
FIG. 1 is a perspective view of a lawn mower cutting implement according to the present invention.

The lawn mower cutting implement 10, shown in FIGS. 1–4, comprises an elongate mounting plate 12 with two end pieces 14 welded or otherwise fixed at opposite ends of plate 12. Hole 13 is formed in the center of plate 12 to facilitate attachment to a lawn mower drive shaft, pulley shaft, or other output shaft (not shown) in lieu of a conventional lawn mower blade. Additional holes, as may be necessary (not shown) may be formed in plate 12 for the purpose of securing implement 10 to the rotating output shaft as is generally known. In use, cutting implement 10 rotates around an axis centered on hole 12 in the direction shown by arrow 29. Mounting plate 12 may be flat, or may have a twist or bend formed therein between center hole 13 and the opposing ends of the plate 12. Mounting plate 12 is shorter than a conventional mower blade in order to accommodate cutting elements extending from opposite ends of the mounting plate 12. End pieces 14 are attached to opposite ends of the mounting plate and extend transverse or normal to mounting plate 12, having a plurality of holes 15a, 15b, 15c and 15d formed therein. End pieces 14 may be rigidly attached to the ends of mounting plate 12, or may be removably attached, if desired.

Figure 2:
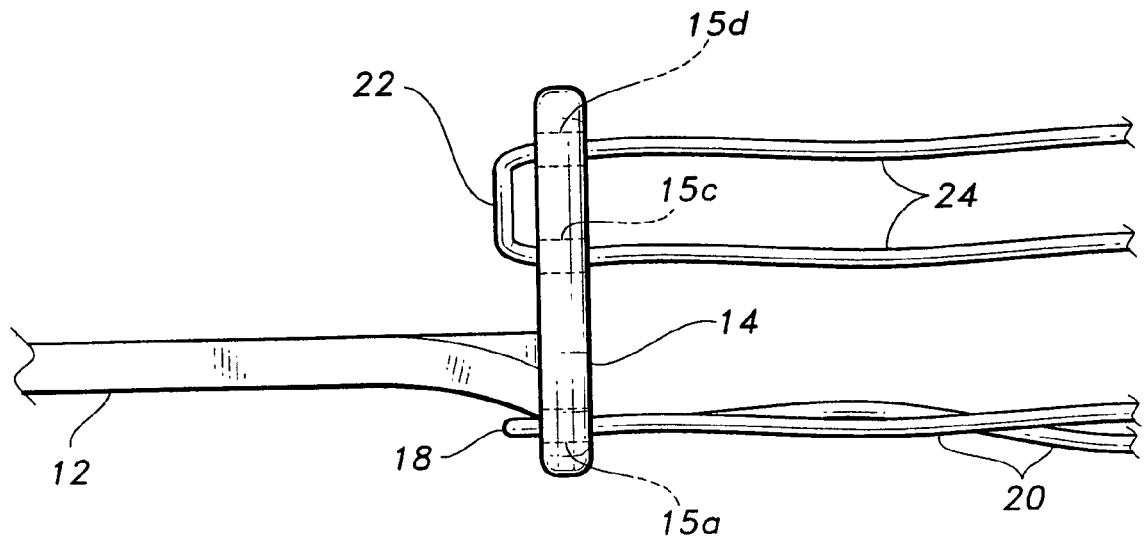
FIG. 2 is a fragmented front elevation view of the cutting implement of the present invention showing attachment of a cutting element to an end piece.
Figure 3:
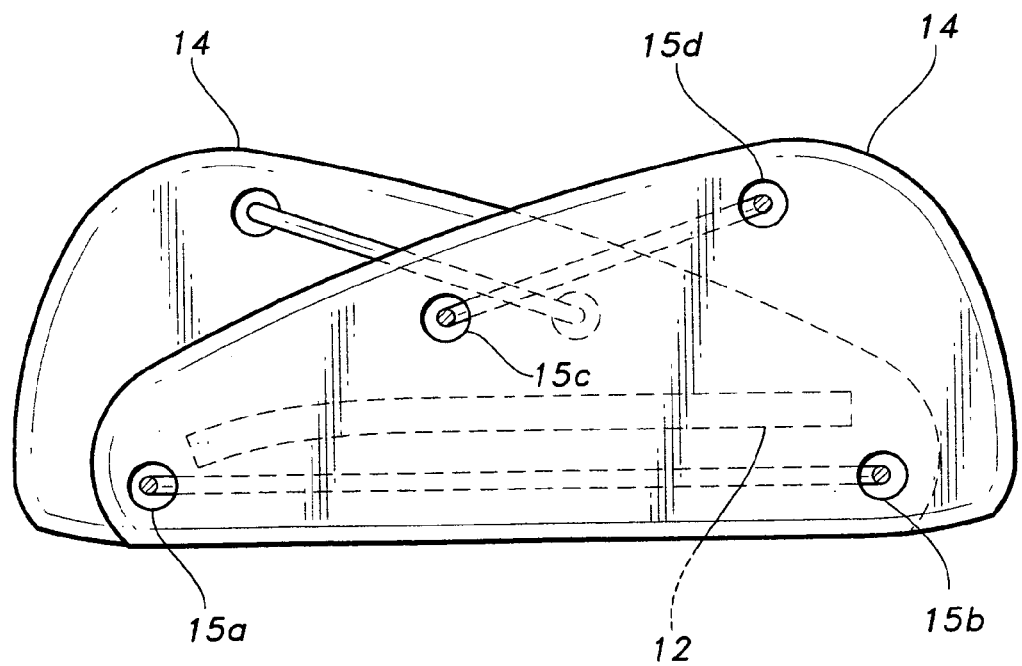
FIG. 3 is a side-view of the lawn mower cutting implement according to the present invention.
Figure 4:
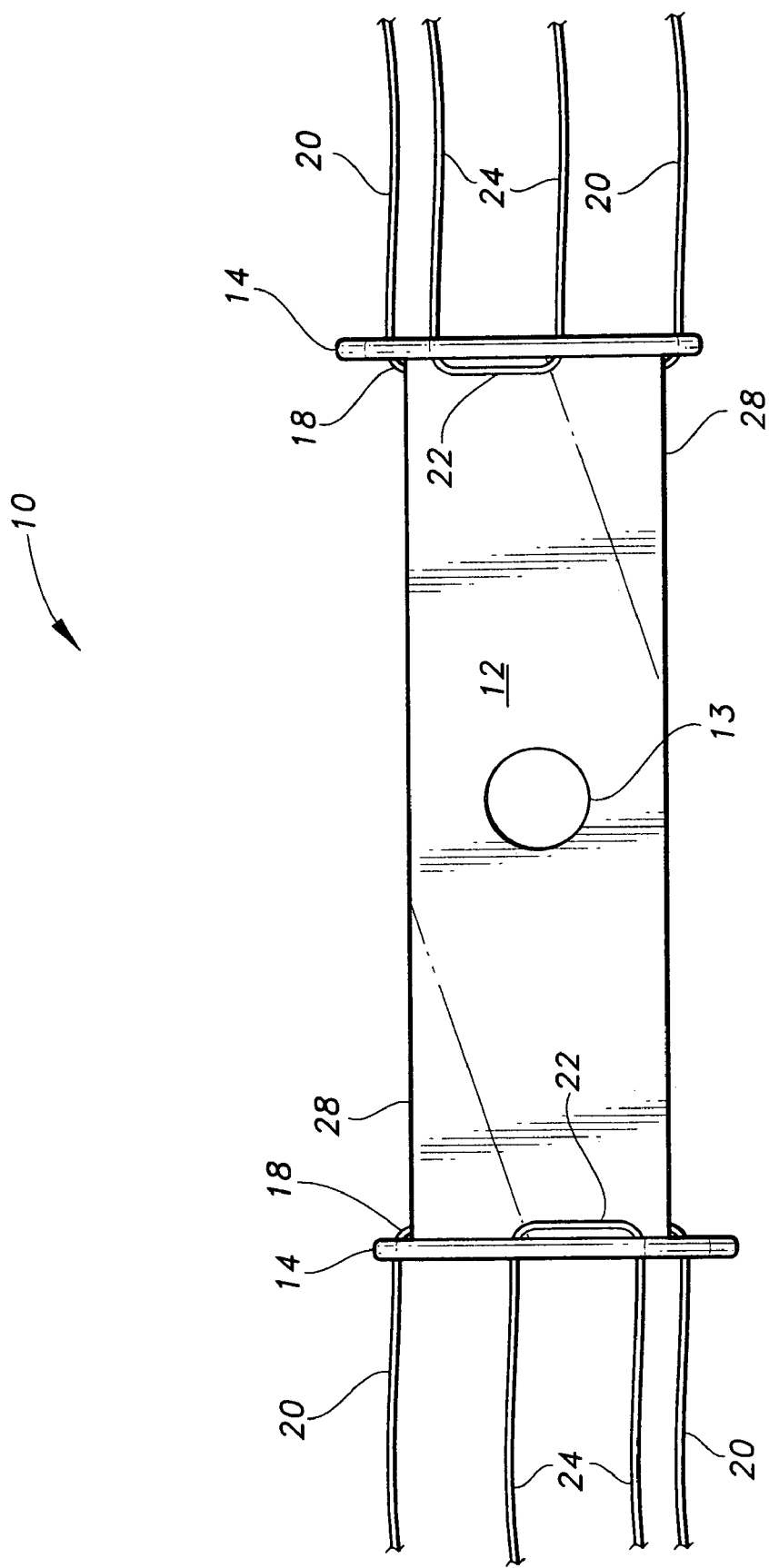
FIG. 4 is a plan view of the lawn mower cutting implement according to the present invention.

The end pieces 14 support cutting elements, such as flexible nylon line, flexible metal wire, rigid pins or nails. As shown in FIGS. 2–4, a cutting element 18, e.g., nylon line, is looped through the lower pair of holes 15a, 15b and an upper cutting element 22, e.g., nylon line, is looped through the upper pair of holes 15c, 15d so that free ends 20, 24 of lower and upper elements 18 and 22, respectively, extend out from each end piece 14. Thus, a total of four lengths of nylon line are used; two for each end piece 14 at either end of plate 12. The nylon line is retained by friction and does not need to be clamped in place.

As mentioned above, in place of nylon line, other cutting elements can be used. For example, metal wire, nails, pins, or the like can be inserted or retained at holes 14. The cutting line may be made from nylon or other polymers and/or composites of polymer and fillers, such as fiberglass, abrasive materials, etc.

The ends 20 of lower cutting element 18 extending from lower holes 15a, 15b provide mowing action and cut each blade of grass to the desired height, while the ends 24 of upper cutting element 22 extending from upper holes 15c, 15d provide an enhanced mulching function to chop suspended clippings into smaller pieces.

Figure 5:
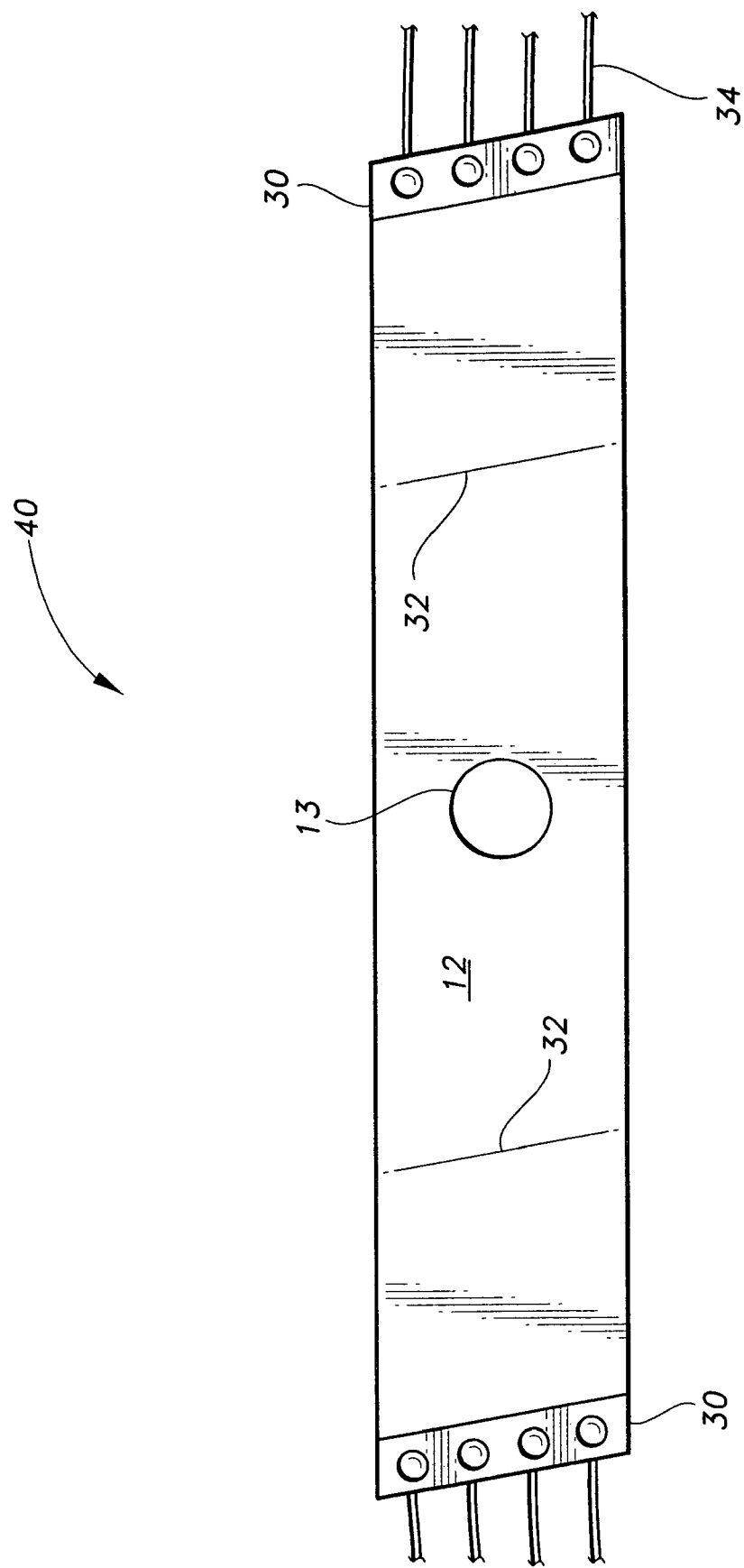
FIG. 5 is a plan view of an alternative embodiment of a lawn mower cutting implement according to the present invention.
Figure 6:
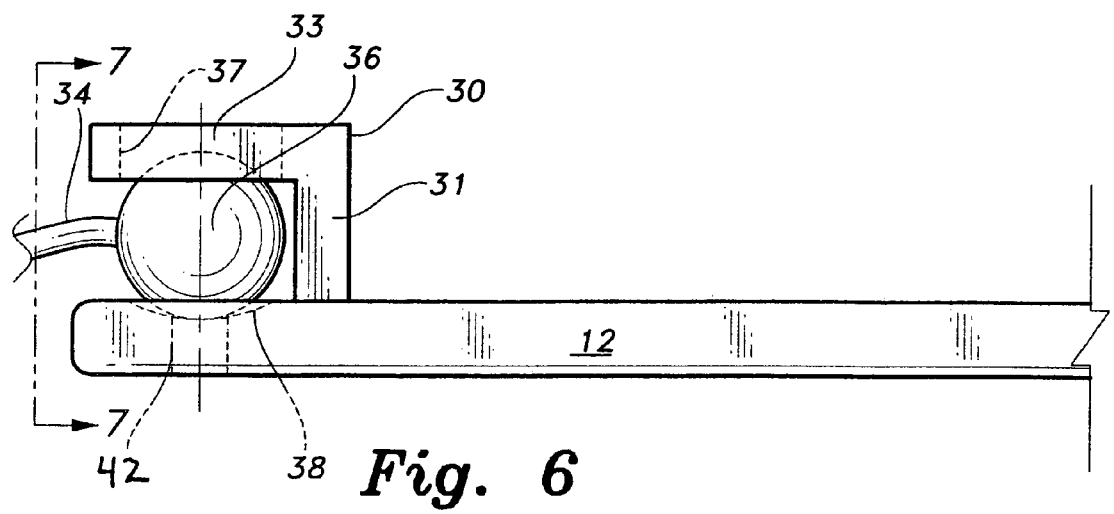
FIG. 6 is a fragmented front elevation view of the lawn mower cutting implement of FIG. 5.
Figure 7:
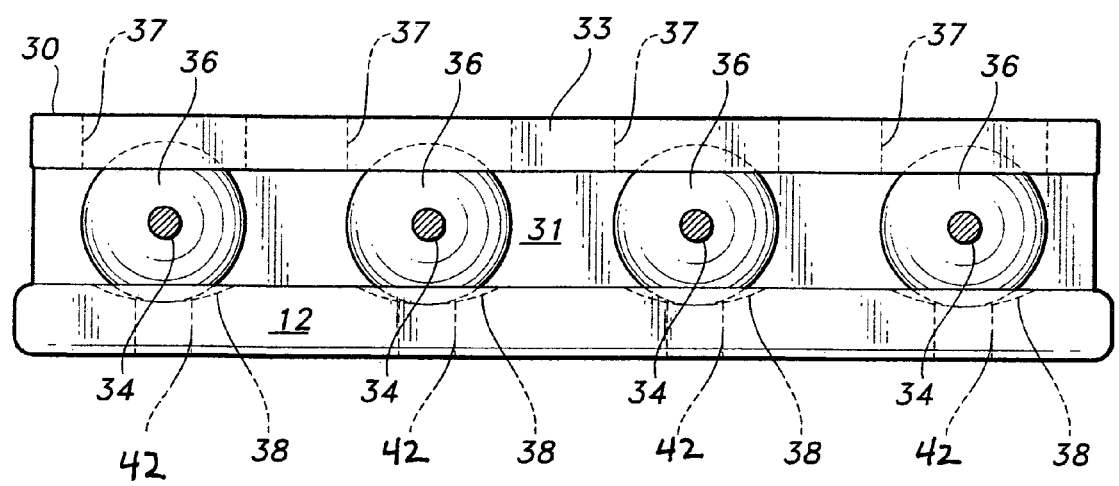
FIG. 7 is an end view of the lawn mower cutting implement of FIG. 5, the cutting elements being in section.

FIGS. 5–7 show an alternative embodiment of a lawn mower cutting implement, designated generally as 40. Plate 12 includes a twist 32 to act as a fan blade and generate airflow. At each end of plate 12 is an end piece 30 having a retainer riser 31 extending orthogonally from plate 12 and a landing 33 arranged parallel to and spaced from the plate 12. As shown in FIG. 5, the ends of plate 12 are angled to provide aerodynamically enhanced circularly outward airflow. End piece 30 retains ball ends 36 of cutting elements 34, i.e., nylon cutting lines, as will now be further described with reference to FIGS. 6 and 7.

FIG. 6 shows a front view showing a line 34 that is fixed to ball 36, which is captured by plate 12 and end piece 30. End piece 30 has a plurality of holes 37 defined in landing 33 through which line 34 is fed, and then ball 36. Once ball 36 passes through hole 37, it is captured by end piece 30 since the space between landing 33 and plate 12 is smaller than the diameter of ball 36. Plate 12 has a depression 38 formed on its upper surface opposite each hole 37 to provide a seat for ball 36 and to assist in retaining ball 36 in end piece 30. FIG. 7 shows an end view demonstrating the impossibility of ball 36 escaping end piece 30. Although shown flat, each ball 36 and line 34 extending therefrom will be at a different height as a result of twist 32 shown in FIG. 5. Thus, four lines 34, each having a different height, will provide exceptional mulching action while the lowest line will do the actual trimming of the grass to the desired height.

As shown in FIGS. 6 and 7, the blade 12 has a bore 42 therein extending into depression 38 beneath each ball to aid in removing worn or torn line 34. A narrow screwdriver or other shaft or rod can be inserted through bore 42 to push ball 36 upward and out through the hole 37 to remove and replace the damaged or worn line.

While cutting implement 40 requires cutting elements 34 especially prepared for use therewith, cutting implement 40 promotes safety by ensuring the proper length of cutting line and simplifies installation of the cutting lines by eliminating the step of threading the line through a small hole and cutting it to length.

Heavy duty nylon line should be capable of cutting and mulching three acres or more of grass before replacement is required. Replacement of the nylon line takes only a few minutes and does not require removal of cutting implement 10 or 40 from the mower deck. Since cutting implements 10 and 40 have no moving parts, the implements are very reliable and could potentially last many years. This avoids having to periodically purchase new mower blades and pay for periodic sharpening thereof, and could therefore potentially save a consumer a great deal of money over the life of the implement.

It is to be understood that the present invention is not limited to the embodiments described above, but encompasses any and all embodiments within the scope of the following claims.

I claim:

1. A lawn mower cutting implement comprising:
an elongated mounting plate having opposing ends, the mounting plate being adapted for attachment to a rotating cutting element driver of a lawn mower;
an end piece attached to each of the opposing ends of the mounting plate; and
a cutting element attached to and extending from each of the end pieces, the cutting element being adapted for cutting vegetation at a desired height;
wherein said mounting plate has a center hole defined therein adapted for receiving a drive shaft of the lawn mower, the mounting plate being formed with a twist disposed between the center hole and each of the opposing ends of the mounting plate for aerodynamically enhanced airflow; and each of the end pieces comprises a riser normal to the mounting plate and a landing extending from the riser parallel to the mounting plate, the landing having a plurality of holes defined therein;
wherein said cutting element comprises a ball having a flexible line extending therefrom, the ball being inserted through a first of said plurality of holes in said landing and retained between said landing and said mounting plate.

2. The lawn mower cutting implement according to claim 1, further comprising at least one other cutting element attached to and extending from each of the end pieces at an elevation higher than said cutting element, the at least one other cutting element being adapted for mulching the cut vegetation.

3. The lawn mower cutting implement of claim 2, wherein said cutting element and said at least one other cutting element being defined respectively as lower and upper cutting elements, and lower and upper cutting elements include flexible nylon cutting line.

4. The lawn mower cutting implement of claim 2, wherein said cutting element and said at least one other cutting element being defined respectively as lower and upper cutting elements, and lower and upper cutting elements include flexible metal wire.

5. The lawn mower cutting implement according to claim 2, wherein said ends of said mounting plate are angled to provide aerodynamically enhanced circularly outward airflow.

6. The lawn mower cutting implement according to claim 1, further comprising a plurality of other cutting elements, each of the other cutting elements being a ball having a nylon cutting line extending therefrom, the ball being inserted through the other ones of the plurality of holes in said landing and retained between said landing and said mounting plate, each of the other cutting elements being spaced apart at different elevations above the cutting element, so that each of the cutting elements rotates in a different vertical plane.

7. The lawn mower cutting implement according to claim 1, wherein said ends of said mounting plate are angled to provide aerodynamically enhanced circularly outward airflow.

8. A lawn mower cutting implement comprising:
an elongated mounting plate having opposing ends, and a mid point, the mounting plate being adapted for attachment to a rotating cutting element driver of a lawn mower;
wherein said mounting plate has a twist therein between the mid point and each one of said opposing ends, said mounting plate having a center hole defined at said mid point and adapted for receiving a drive shaft of the lawn mower, the twist of said mounting plate being disposed between the center hole and each of the opposing ends of the mounting plate for aerodynamically enhanced airflow;

an end piece attached to each of the opposing ends of the mounting plate, each of the end pieces having a riser normal to the mounting plate and a landing extending from the riser parallel to the mounting plate, the landing having a plurality of holes defined therein; and a plurality of cutting elements attached to and extending from each of the end pieces, each of the cutting elements being a ball having a nylon cutting line extending therefrom, the ball being inserted through one of the plurality of holes in the landing and retained between the landing and the mounting plate, each of the cutting elements being spaced apart at different elevations, so that each of the cutting elements rotates in a different plane.

9. The lawn mower cutting implement according to claim 8, wherein said ends of said mounting plate are angled to provide aerodynamically enhanced circularly outward airflow.

* * * * *